(12) United States Patent
Roethig et al.

(10) Patent No.: US 6,487,705 B1
(45) Date of Patent: Nov. 26, 2002

(54) TIMING OPTIMIZATION AND TIMING CLOSURE FOR INTEGRATED CIRCUIT MODELS

(75) Inventors: Wolfgang Roethig, San Jose, CA (US); Attila Kovacs-Birkas, Santa Clara, CA (US)

(73) Assignee: NEC Electronics, Inc., Santa Clara, CA (US)

( * ) Notice: Subject to any disclaimer, the term of this patent is extended or adjusted under 35 U.S.C. 154(b) by 0 days.

(21) Appl. No.: 09/946,240

(22) Filed: Sep. 5, 2001

(51) Int. Cl.[7] .............................................. G06F 17/50
(52) U.S. Cl. ................................ 716/6; 716/10; 716/13
(58) Field of Search ................................. 716/1–2, 4–7, 716/9–18; 703/19

(56) References Cited

U.S. PATENT DOCUMENTS 5,461,576 A * 10/1995 Tsay et al. ..................... 716/13
5,572,437 A * 11/1996 Rostoker et al. ............... 703/13

* cited by examiner

Primary Examiner—Matthew Smith
Assistant Examiner—Paul Dinh
(74) Attorney, Agent, or Firm—Skjerven Morrill LLP

(57) ABSTRACT

A method correlates a timing target for electronic design automation (EDA) design tools by comparing slack distributions. A method of designing an integrated circuit can include designing an integrated circuit by RTL synthesis with embedded timing analysis and optimization and placement of cells with embedded timing analysis and optimization. The method can also include designing an integrated circuit by routing with embedded timing analysis and optimization; performing reference timing analysis; performing reference timing analysis and embedded timing analysis using a parasitic estimation model. The method can also include comparing at least two slack distributions resulting from timing analyses. The method can include calculating and comparing autocorrelation functions of slack distributions. The method can include calculating interrcorrelation functions of slack distributions. An embodiment teaches an integrated circuit designed by the method taught. Another embodiment teaches a computer program product according to the method taught.

34 Claims, 7 Drawing Sheets

TIMING OPTIMIZATION AND TIMING CLOSURE FOR INTEGRATED CIRCUIT MODELS

BACKGROUND OF THE INVENTION

1. Field of the Invention

The present invention relates to a timing model for an integrated circuit. More specifically, the present invention relates to method for developing an integrated circuit design to meet timing specifications.

2. Description of the Related Art

Digital circuits, no matter how complex, are composed of a set of building blocks. These blocks can be basic gates, memory cells or other structures. But the majority of digital circuits are composed of gates or combinations of gates. Gates are combinations of high-speed electronic switches. Memory cells are composed of basic logic gates. A flip-flop, for example, can be considered as a memory cell. A microprocessor is a central processing unit of a computer or other device using thousands (or millions) of gates, flip-flops and other memory cells.

Sub-micron designs of integrated circuit chips require accurate timing analysis to prevent operational errors. These timing errors create operational errors which prevent a design, or a manufactured chip, from accomplishing its intended purpose. It is known to use available software tools to design an integrated circuit and to model the functions and timing of the signals on the circuit.

It is known to manufacture an integrated circuit using conductors separated by a semi-conductor. Circuits are fabricated on a semiconductor by selectively altering the conductivity of the semiconductor material. Various conductivity levels correspond to elements of a transistor. Transistors, diodes, resistors, and small capacitors are formed on small chips of silicon. Individual components are interconnected by aluminum or gold wiring patterns. Integrated circuits are then mounted on etched circuit boards which are used to assemble electronic systems such as personal computers and other data processing equipment.

It is known to use commercially available software to model certain features of integrated circuits. For example Verilog, originally designed by Gateway Design Automation in 1985, is a hardware description language (HDL) most predominantly used in the United States. Verilog was made available to the public in 1990 and has been adopted as a standard by the Institute of Electrical and Electronic Engineers (IEEE).

Other electronic design automation (EDA) tools are available to simulate logic of a processor. As electronic design tools became more popular, vendors began to provide enhanced functions. EDA tools are now used to drive synthesis, timing, simulation, test and other tools. Other vendors of EDA tools are: Cadence Corporation, Providence, R.I.; Mentor Graphics, Oreg.; Snyopsys, Calif.; and Snytest Technologies, Inc. California. These products are listed as examples only, other manufactures use proprietary tools for the same purpose. Electronic design automation (EDA) tools were originally designed to simulate logic. As electronic design tools became more popular, vendors began to provide enhanced functions. EDA tools are now used to drive synthesis, timing, simulation, test and other tools. Other vendors of EDA tools are: Cadence Corporation, Providence R.I.; Mentor Graphics, Wilsonville, Oreg.; Snyopsys, Mountainview, Calif.; and Snytest Technologies, Inc., Sunnyvale, Calif. These corporations are listed as examples only, other manufactures use proprietary tools for the same purpose. For example the Silicon Ensemble tool provided by Cadence places and routes wires on the integrated circuit driven by timing constraints.

Register transfer level synthesis (sometimes referred to as "RTL synthesis" or simply "synthesis"), placement and routing are essential steps to transform a formal functional description of a digital circuit into a design which can be manufactured. Currently available software tools can produce a design according to synthesis, placement and routing. Capacitance, resistance and inductance (collectively referred to as electrical parasitics) resident in the blocks and interconnections influence the timing behavior of the integrated circuit being designed. Thus, neither the electrical performance of the circuit nor the timing behavior are specified in the design.

Referring to FIG. 1, the steps shown are directed to design a circuit with the desired electrical performance and within the specified timing parameters (e.g., correct operation at a given clock frequency and manufactured with a specific die size). The design process consists of subsequent design steps A, B, C . . . M. As further discussed below, design step A is exemplified by RTL synthesis. Design step B is exemplified by placement, 120. Design step C is exemplified by routing, 130.

It will be noted that the variable identifier "M" is used in FIG. 2 and FIG. 4 to more simply designate the final step in a series of steps. (Similarly, variable identifier "N" is used in FIGS. 3B and 5 for the same purpose.) The use of such variable identifiers does not require that each series of elements has the same number of elements as another series delimited by the same variable identifier. Rather, in each instance of use, the variable identified by "M" may hold the same or a different value than other instances of the same variable identifier. Similarly, in each instance of use, the variable identified by "N" may hold the same or a different value than other instances of the same variable identifier.

Design Step A, RTL synthesis 110, transforms an abstract behavior description of an electronic circuit into a functionally equivalent structural description. The behavior description is represented in design database A, 114. The structural description is represented in design database B, 124. The components from which the structural description is built are selected from a library. This library has been characterized to contain information necessary to perform embedded timing analysis for the electronic circuit. Referring briefly to FIG. 2, the library contains a timing model for each arc of the component, timing model for arc 260. A timing arc denotes the abstract specification of a timing measurement. (An example of a timing measurement is a delay from rising edge at pin Y to a falling edge at pin Z.) The library also contains at least one parasitic estimation model, 295 (described in FIG. 2, below). The purpose of embedded timing analysis is to enable optimization within 110 until the electronic circuit meets the desired timing specification. Referring briefly to FIG. 2, the desired timing specification is represented by timing constraints and exceptions from designer, 250. Slack distribution A, 118, provides a representation of the result of embedded timing analysis.

Design step B, placement 120, specifies a physical location for each component of the electronic circuit on a silicon die, printed circuit board, etc., based on the structural electronic circuit information in design database B, 124. The result of design step B is represented in design database C, 134. Placement also contains embedded timing analysis and optimization. The timing model for arc, 260, is similar as for design step A. However, parasitic estimation model, 295, is different. In design step A, parasitic estimation was based on structural circuit description only, whereas in design step B placement information is available for more accurate parasitic estimation. Slack distribution B, 128, again provides a representation of the result of embedded timing analysis.

Design step C, routing, 130, specifies physical interconnect routes between the individual components, based on the structural electronic circuit information and placement information in design database C, 134. The result of design step C is represented in reference design database, 140. Routing also contains embedded timing analysis and optimization. The timing model for arc, 260, is similar as for design step A and B. However, the parasitic estimation model, 295, is different. The estimation model is more accurate than in design step A and B, because specific route information is available. Specific route information was not available in design step A and B. Slack distribution C, 138, again provides a representation of the result of embedded timing analysis. Slack distribution, 138, again provides a representation of the result of embedded timing analysis.

Reference timing analysis, 142, is performed in order to verify that the electronic circuit meets the desired timing specification, based on reference design database, 140. Timing model for arc, 260, is similar as for design step A, B, and C. However, the parasitic estimation model, 295, is different. Specific route information is available in the reference design database, 140, for all interconnections of the electronic circuit, whereas in design step C, only partial route information was available, as the route were being specified. Therefore, the most accurate parasitic estimation model, also called parasitic extraction model, is chosen for reference timing analysis, 142. Reference slack distribution, 148, again provides a representation of the result of embedded timing analysis.

FIG. 2 shows details on timing analysis. These details are pertinent to embedded timing analysis in design step A, B, C . . . M as well as to reference timing analysis. Design database A, B, C . . . M, 210, contains information about the implementation of the electronic circuit. Depending on the available implementation information, an appropriate parasitic estimation model, 295, is chosen. The parasitic estimation engine, 220, calculates parasitic data, 270, based on design database, 210, and parasitic estimation model, 295. Therefore, the accuracy of the resulting parasitic data, 270, depends on the available implementation information contained in database, 210, and on the inherent accuracy of the parasitic estimation model, 295. The accuracy of the resulting parasitic data, 270, depends also on the calculation capability of the parasitic estimation engine, 220. Delay calculation engine, 280, calculates the delay, i.e., the elapsed time for a signal to travel from the start point to the end point of a timing arc, for each component in the electronic circuit. This calculation is based on design database, 210, parasitic data, 270, and timing model for arc, 260. The accuracy of the resulting timing data for arc, 290, is therefore limited by the accuracy of the parasitic data, 270. Timing analysis engine, 230, combines timing data for arc, 290, along each path as defined by the structure of the electronic circuit given in design database, 210. Timing analysis engine, 230, compares the combination of timing data for arc, 290, against timing constraints and exceptions from designer, 250, in order to check whether the desired timing is met. The result is represented in slack distribution, 240.

Timing closure is the agreement between timing results in design steps X (X=A,B,C . . . M) and the result of reference timing analysis, which is represented by correlation between the slack distributions resulting from embedded timing analyses in design steps X and the slack distribution resulting from reference timing analysis.

The following conditions are necessary, but not sufficient, to achieve timing closure: similarity between the timing models for arc (260 in FIG. 2); similarity between the delay calculation engines (280 in FIG. 2); similarity between the timing analysis engines (230 in FIG. 2), compatibility between timing constraints and exceptions from designer (250 in FIG. 2). These conditions can be satisfied by choosing and qualifying appropriate software tools for design steps X. For example: Design step A can be performed by the Design Compiler tool from Synopsys or by the BuildGates tool from Cadence; and design step B can be performed by the Qplace tool from Cadence; and design step C can be performed by the Wroute tool from Cadence or by the Apollo tool from Avant!. Alternatively, a combination of design step A and design step B can be performed by the Physical Compiler tool from Synopsys, or the PKS tool from Cadence, etc.

However, estimating the parasitics for each wire is only one of the problems which arise during attempts to achieve timing closure in the design of an integrated circuit. In the early design phase each wire has many degrees of freedom. Therefore any circuit can be designed in several alternate paths. Each path has different electrical parasitics. Therefore, only a lumped capacitance is typically estimated for each wire. Using a lumped capacitance allows a designer to attempt to match the total distributed resistances, inductances and capacitances (collectively known as "RLCs") on a wire. But even if the total RLCs match, the timing would not match, since the effect of distribution of the components is neglected. Another problem is the lack of one-to-one correspondence of logical and physical wires. A logical wire may be broken into multiple physical wires by inserting buffers. Also, the logic of specific functions may be restructured and therefore not preserved, during the process.

In addition, it is not possible to utilize the timing models in the same manner during each step of the design process. During early design steps the timing models should be dependent upon a single value ("lumped") capacitance. In later design steps the timing models are dependent on distributed RLCs. Calculations methods (sometimes referred to as "effective capacitance" methods) should depend on distributed RLCs. Thus, capacitance calculation methods attempt to match the model using a lumped capacitance with the timing based on distributed RLCs. However, the lumped capacitance does not equal the actual capacitance and depends on local electrical effects. These local electrical effects are different from wire to wire, e.g. drive strength, signal transition time. In addition, wire-to-wire capacitance (also known as a "crosstalk effect") and simultaneously switching signals also change the timing in a way that cannot be accurately accounted for using "effective capacitance."

In theory, different timing engines analyzing a design under equivalent constraints should give matching results. However, for the following reasons the results must be verified for each design. Convergent timing arcs on a path may be handled algorithmically different by different engines. Timing exceptions (i.e. exclusion of non-relevant paths from analysis) may be handled differently by different engines, or the user may have made mistakes in specifying the intentionally equivalent timing exceptions in different tool-specific languages. This problem would be solved by using the same timing engine for each design step, but this is often not possible. A unique timing engine is embedded in each design tool. The unique timing engines cannot be exchanged between design tools. (As an analogy, a motor is an integral part of a car and cannot be arbitrarily replaced by a motor designed for a different car.)

Attempts in the related art to drive the design tools towards a common timing target correlate the different factors of influence (e.g., electrical parasitics, timing characterization models, and timing engines) in isolation. In some instances, even with a large number of iterations, the timing correlation cannot be satisfied. When timing correlation is not achieved timing closure is not achieved. As a consequence, the RTL synthesis tool, the placement tool and the routing tool may anticipate a different timing result than the actually achieved timing result. Under design leads to excessive iterations, increasing the cost and delaying the production of the design. In the case of over design, the lack of timing correlation leads to a circuit which is larger, slower or consumes more power than necessary to accomplish the desired function.

SUMMARY OF THE INVENTION

A method correlates a timing target for electronic design automation (EDA) design tools by comparing slack distributions. A method of designing an integrated circuit can include designing an integrated circuit by RTL synthesis with embedded timing analysis and optimization and placement of cells with embedded timing analysis and optimization. The method can also include designing an integrated circuit by routing with embedded timing analysis and optimization; performing reference timing analysis; performing reference timing analysis and embedded timing analysis using a parasitic estimation model. The method can also include comparing at least two slack distributions resulting from timing analyses. The method can include calculating and comparing autocorrelation functions of slack distributions. The method can include calculating interreorrelation functions of slack distributions.

An embodiment of the disclosure teaches an integrated circuit designed by the method taught. Another embodiment of the disclosure teaches a computer program product including computer instructions configured to perform the method taught.

The foregoing is a summary and this contains, by necessity, simplifications, generalizations and omissions of detail; consequently, those skilled in the art will appreciate that the summary is illustrative only and is not intended to be in any way limiting.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting. The disclosure teaches a method of satisfying sufficient conditions for timing closure.

Slack distribution X (X=A, B, C . . . M) will correlate with reference slack distribution, if all the inputs for generating the slack distribution are similar. However, while related art can provide similarity between some inputs, it is not possible to provide suffient similarity between the design database X, because this database changes throughout the design process. Changes in the design database make it difficult to correlate the parasitic data on each interconnect. Embedded optimization in each design step X may change the structure of the electronic circuit. For example, insertion of a buffer will split one interconnect into two interconnects. However, such structural changes will not significantly affect the total number of paths between primary inputs and primary outputs of the electronic circuit, provided that the functional specification of the electronic circuit is preserved.

Figure 3A:
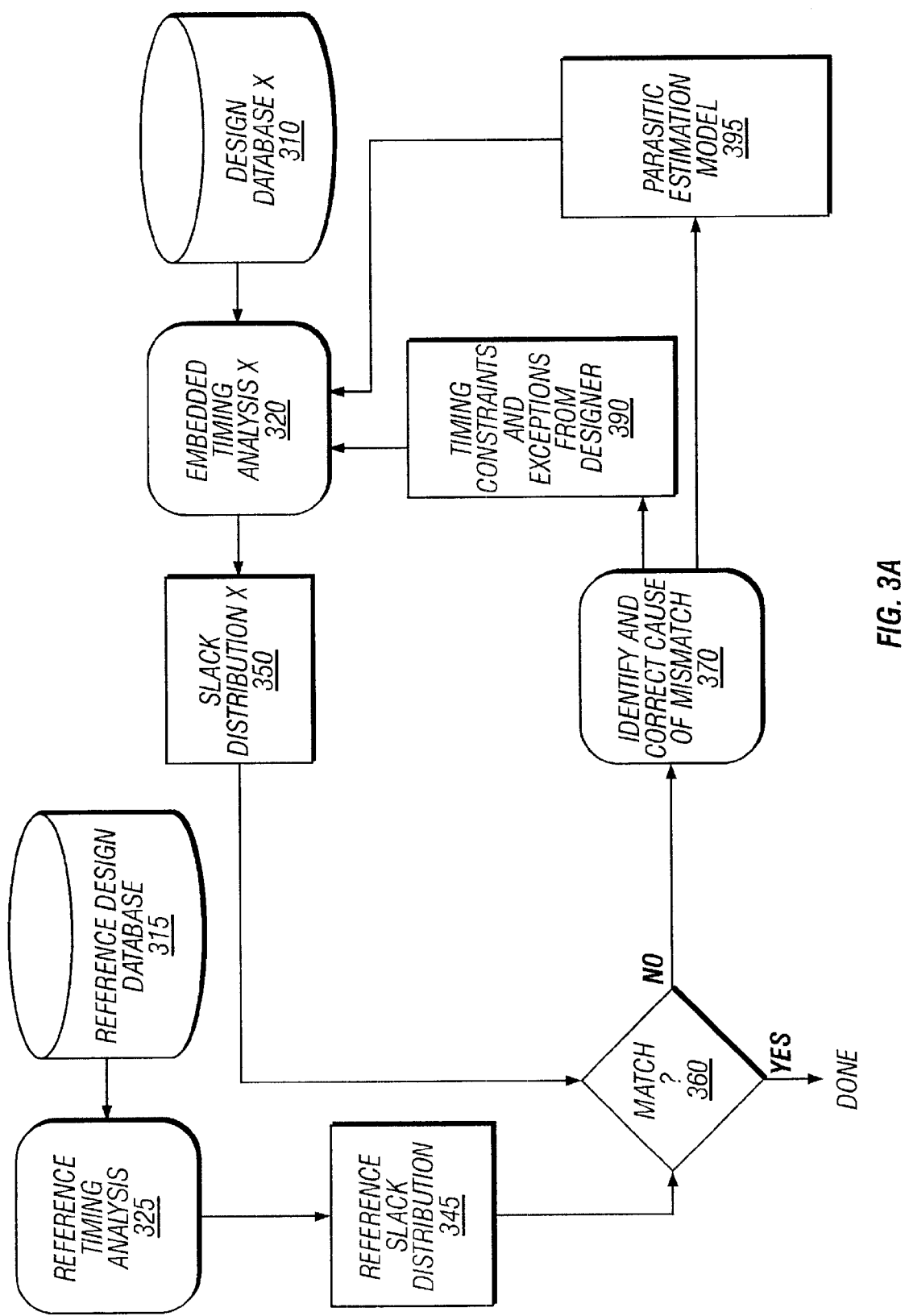
FIG. 3A and FIG. 3B are flow diagrams showing methods of performing an embedded timing analysis on a block of an integrated circuit.

FIG. 3A shows a method of achieving correlation between each slack distribution X, 330, and reference slack distribution, 345, in the case where the structural hierarchy of the electronic circuit does not change between design steps. Slack distribution X, 350, resulting from embedded timing analysis X, 320, performed on design database X, 310, is directly compared with reference slack distribution, 345, resulting from reference timing analysis, 325, performed on reference design database, 315. The comparison, 360, will either establish a satisfactory match or a mismatch. In the case of mismatch, identification and correction of the cause of mismatch, 370, will be performed. Identification and correction of the cause of mismatch, 370, results in a change of the timing constraints and exceptions from designer, 390, or in the selection of a different parasitic estimation model, 395, or in a combination of both.

Figure 3B:
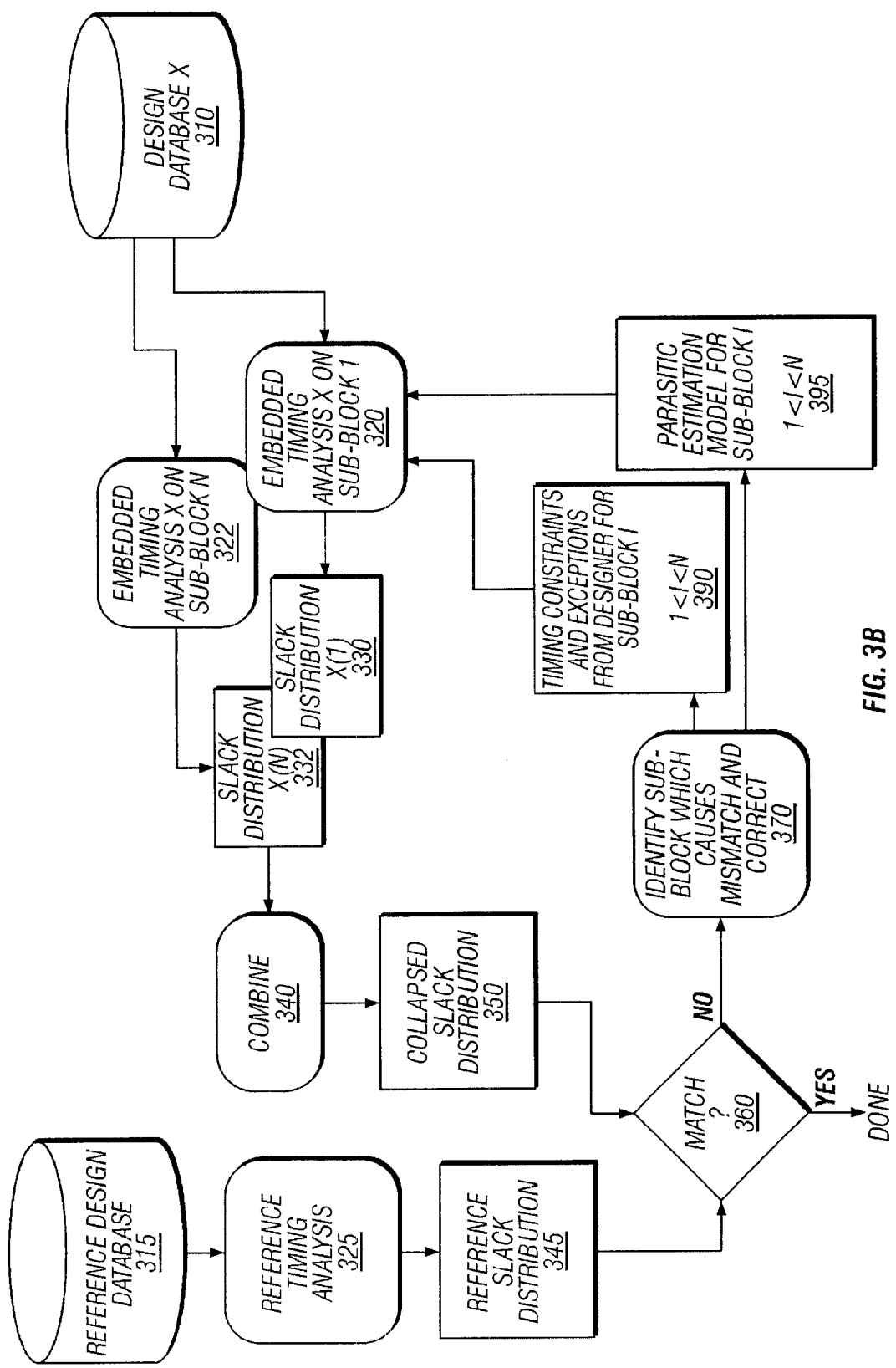

FIG. 3B shows a method of achieving correlation between each collapsed slack distribution, 350, and reference slack distribution, 345, in the case where the structural hierarchy of the electronic circuit changes between design steps. Sub-blocks of a hierarchy may be collapsed into one block in a subsequent design step. Slack distribution X(1), 330, resulting from embedded timing analysis X on sub-block 1, 320, through slack distribution X(N), 332, resulting from embedded timing analysis X on sub-block N, 322, all performed on design database X, 310, are combined in 340. The resulting collapsed slack distribution, 350, is compared with reference slack distribution, 345, resulting from reference timing analysis, 325, performed on reference design database, 315. The comparison, 360, will either establish a satisfactory match or a mismatch. In the case of mismatch, identification and correction of the cause of mismatch, 370, will be performed. Identification and correction of the cause of mismatch, 370, results in a change of the timing constraints and exceptions from designer for a sub-block i ($1 \leq i \leq N$), 390, or in the selection of a different parasitic estimation model for a sub-block i ($1 \leq I \leq N$), 395, or in a combination of both.

The following paragraph describes one embodiment of logical step 370, shown on FIG. 3A and 3B. In a first step, the total number of paths reported in slack distribution, 350, is compared with the total number of paths reported in reference slack distribution, 345. If there is a significant difference (e.g., more than 5%), erroneous timing constraints and exceptions from the designer are the cause that must be corrected. Once the total number of paths matches within an acceptable error bound (e.g., 5%), the autocorrelation of slack distribution, 345, and the autocorrelation of reference slack distribution, 345, are calculated and compared. Slack distribution can be represented as a discrete function P(S), where P is the number of paths with a given slack S. The autocorrelation function $C_P(T)$ for P(S) is defined by equation 1, below.

$$C_P(T) = \sum_{S=-\infty}^{S=+\infty} P(S) * P(S+T) \qquad \text{Equation 1}$$

A measure for matching slack distribution is the normalized error between the data points $C_P(T=0)$, given in Equation 2, below.

$$error = \frac{C_{P2(T=0)} - C_{P1(T=0)}}{C_{P1(T=0)}} * 100\% \qquad \text{Equation 2}$$

Another measure for matching slack distribution is the normalized error between the autocorrelation functions, given by Equation 3, below.

$$error = \frac{\sum_{T=-\infty}^{T=+\infty} C_{p2}(T) - C_{p1}(T)}{\sum_{T=-\infty}^{T=+\infty} C_{p1}(T)} * 100\% \qquad \text{Equation 3}$$

If the error is outside an acceptable bound (e.g., 10%), a poor structural hierarchy of the electronic circuit is the cause. This can be corrected by choosing a different structural hierarchy and repeating all design steps required for creation of design database X, 310, and reference design database, 315. If the error is within an acceptable bound (e.g., 10%), the intercorrelation function between slack distribution, 350, and reference slack distribution, 345, is calculated. The intercorrelation function between two slack distributions P1(S) and P2(S) is defined in equation 4, below.

$$C_{P_1,P_2}(T) = \sum_{S=-\infty}^{S=+\infty} P_1(S) * P_2(S+T) \qquad \text{Equation (4)}$$

This intercorrelation function has an absolute maximum for a particular value of T. This maximum is compared to the datapoint $C_P(T=0)$ from the reference slack distribution, 345. If there is a significant mismatch, a different parasitic estimation model, 395, must be selected and all design steps required for creation of design database X, 310, and reference design database, 315, must be repeated.

Figure 4:
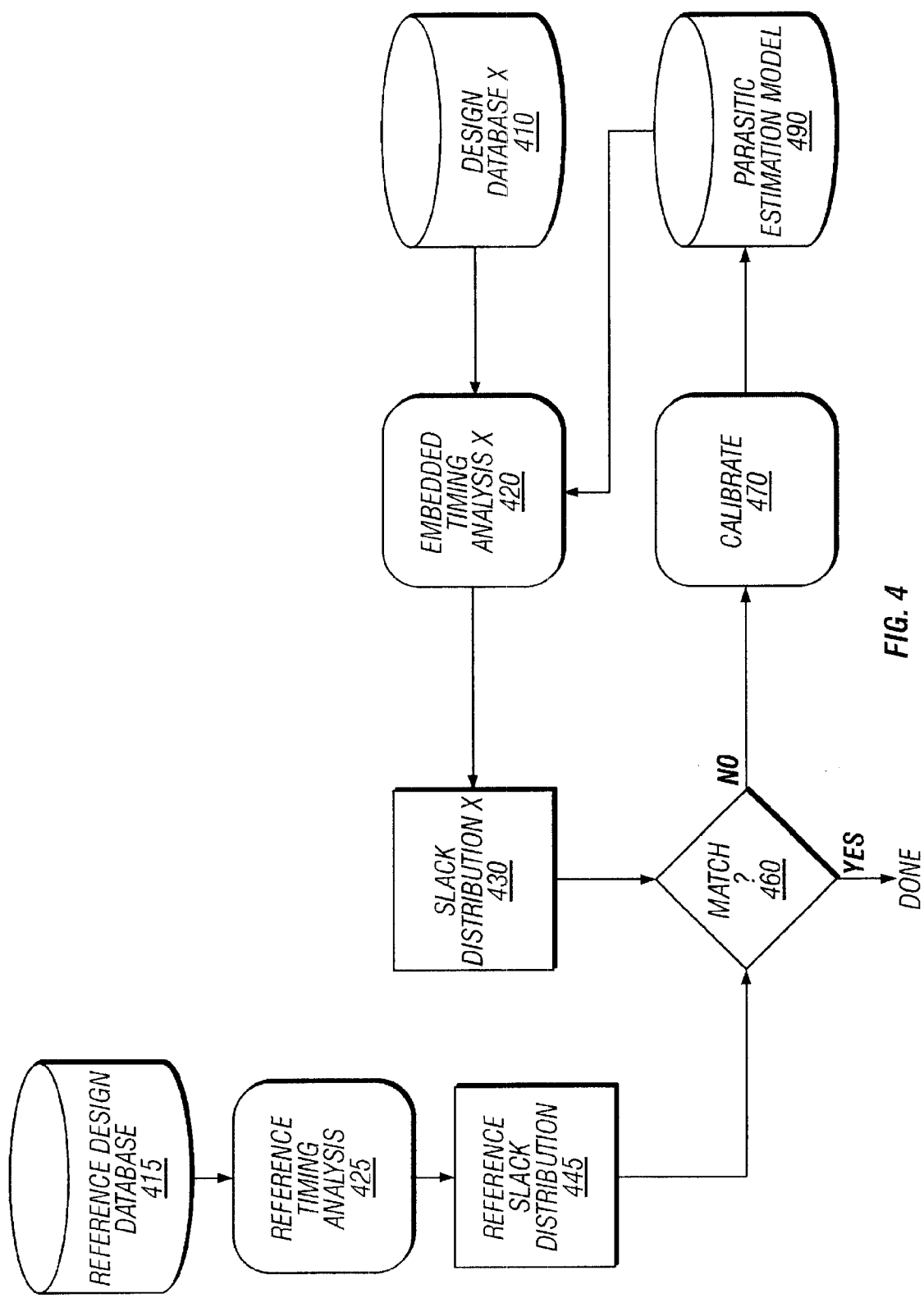
FIG. 4 is a flow diagram showing a method of performing an embedded timing analysis on sub-blocks of an integrated circuit.

FIG. 4 shows the calibration method, 470, applied to the parasitic estimation model, 490. The methods shown in FIG. 3A and FIG. 3B precede the method shown in FIG. 4. Slack distribution X, 430, resulting from embedded timing analysis X, 420, performed on design database X, 410, is compared with reference slack distribution, 445, resulting from reference timing analysis, 425, performed on reference design database, 415. In case where N sub-blocks in design database X, 410, correspond to one block in reference design database, 415, slack distribution X, 430, represents a collapsed slack distribution, corresponding to the collapsed slack distribution, 350, in FIG. 3B. Match, 460, determines, if the intercorrelation function has its maximum at T=0. If the maximum is at $T_{max}$, where $T_{max}$ is different from zero, the calibration step, 470, applies a global scaling factor $A_{shift}$ to the parasitic estimation model, 490. Embedded timing analysis X, 420, is performed again, based on the scaled parasitic estimation model, 490. The new slack distribution X, 430, based on embedded timing analysis X, 420, will have a similar shape as the previous one, but it will be shifted by $T_{shift}$. The goal is to equate $T_{shift}$ with $-T_{max}$. As a result, the new intercorrelation function will have its maximum at T=0. The Newton-Rhapson method can be applied between subsequent iterations, as shown in equation 5, below.

$$A_{shift} \approx T_{shift} * \Delta A / \Delta T \qquad \text{Equation 5}$$

In Equation 5, $\Delta A$ is the difference between $A_{shift}$ in subsequent iterations and $\Delta T$ is the difference between $T_{shift}$ in subsequent iterations. $A_{shift}$ will converge to zero, therefore $T_{shift}$ will also converge to zero.

Figure 5:
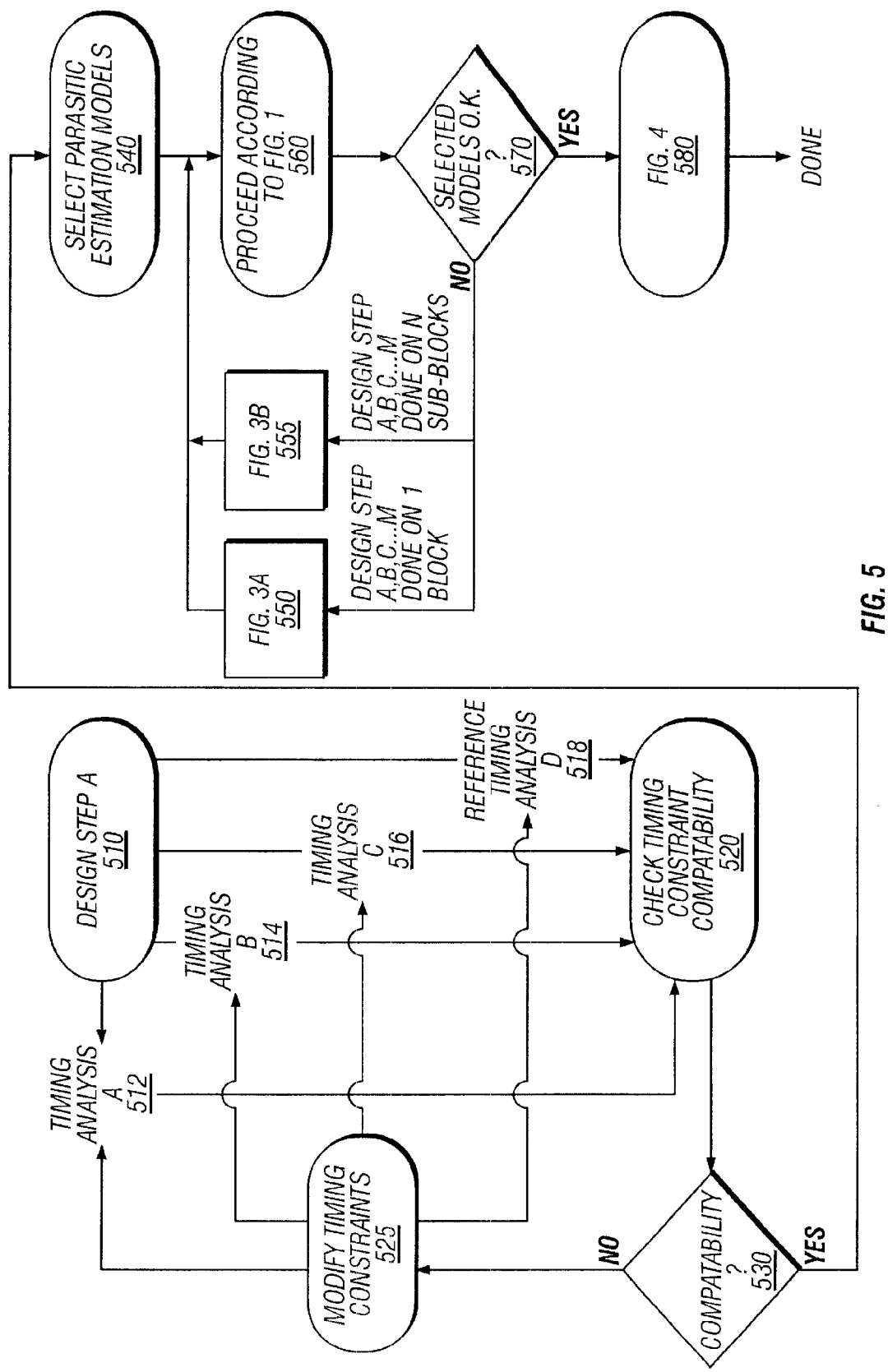
FIG. 5 is a flow diagram showing a logical method of combining logical steps previously described in FIG. 3A, FIG. 3B, and FIG. 4.

FIG. 5 shows a method of combining logical steps described in FIG. 3A, FIG. 3B, and FIG. 4. The identification and correction of mismatch, 370, in FIG. 3A and FIG. 3B is performed by going through the minimal number of design steps X (X=A,B,C . . . M). In order to identify timing constraints and exceptions from designer, 390, in FIG. 3A and FIG. 3B as a cause of mismatch between slack distributions, it is only necessary to perform design step A, and to perform all embedded timing analyses X and reference timing analysis on design database A. In other words, design database A can serve as the reference design database for the purpose of checking timing constraint compatibility, 520, between timing analysis A, 512, timing analysis B, 514, timing analysis C, 516, and reference timing analysis, 518. Modification of timing constraints, 525, is performed until compatibility, 530, is achieved. Subsequently, selection of parasitic estimation models, 540, is performed, and the design steps X (X=A, B, C . . . M) are performed according to FIG. 1, 560. Decision, 570, determines whether the selected models are suitable, as described in FIG. 3A, 550, or FIG. 3B, 555. In this manner, logical step 390 in FIG. 3A and FIG. 3B are no longer applicable, because they have been performed in the combination of logical steps 520, 530, and 525. If the selected models are suitable according to the method described in FIG. 3A and FIG. 3B, calibration is performed according to FIG. 4, 580.

Figure 1:
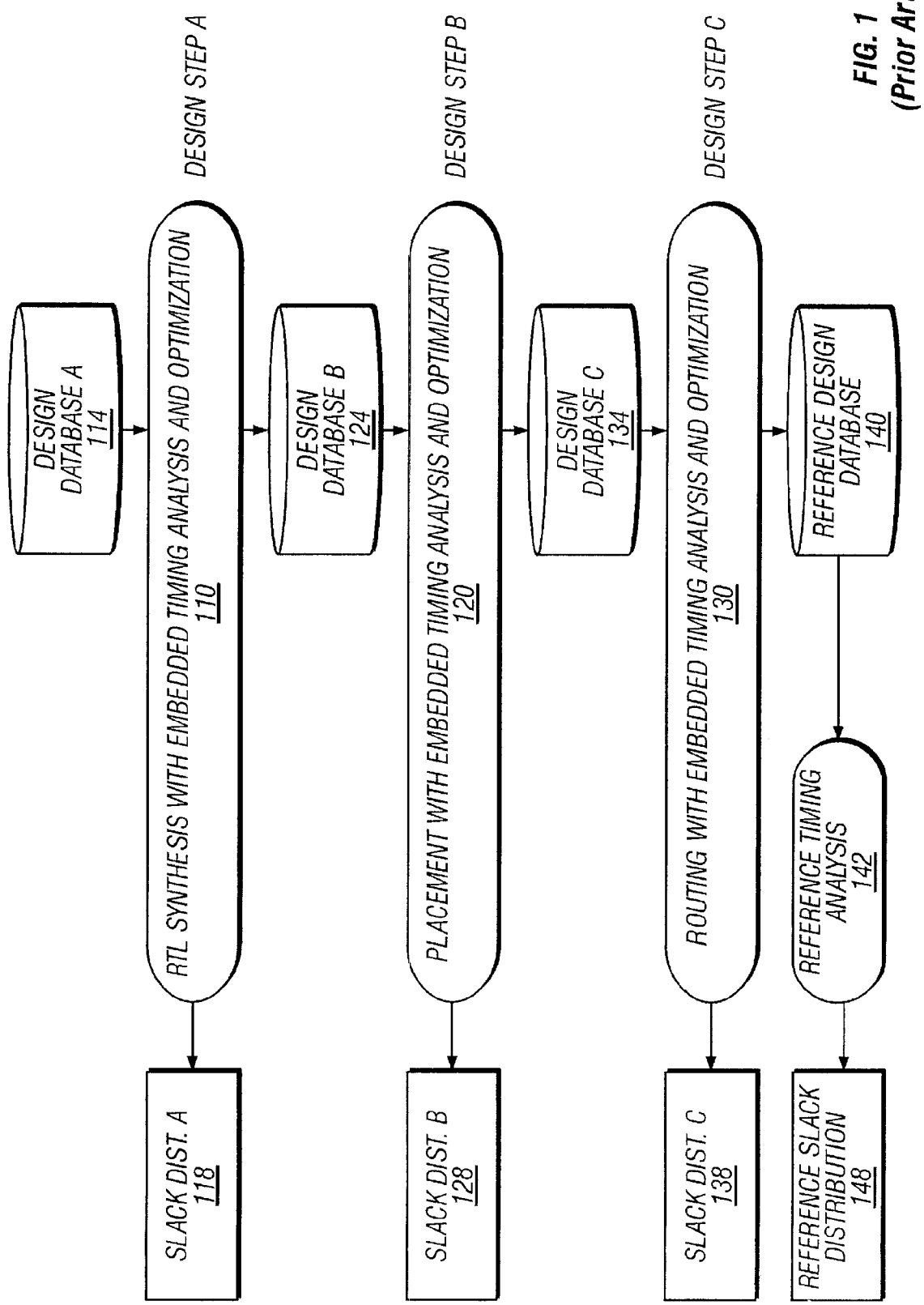
FIG. 1 is a flow diagram showing a method in the related art of designing an integrated circuit.
Figure 2:
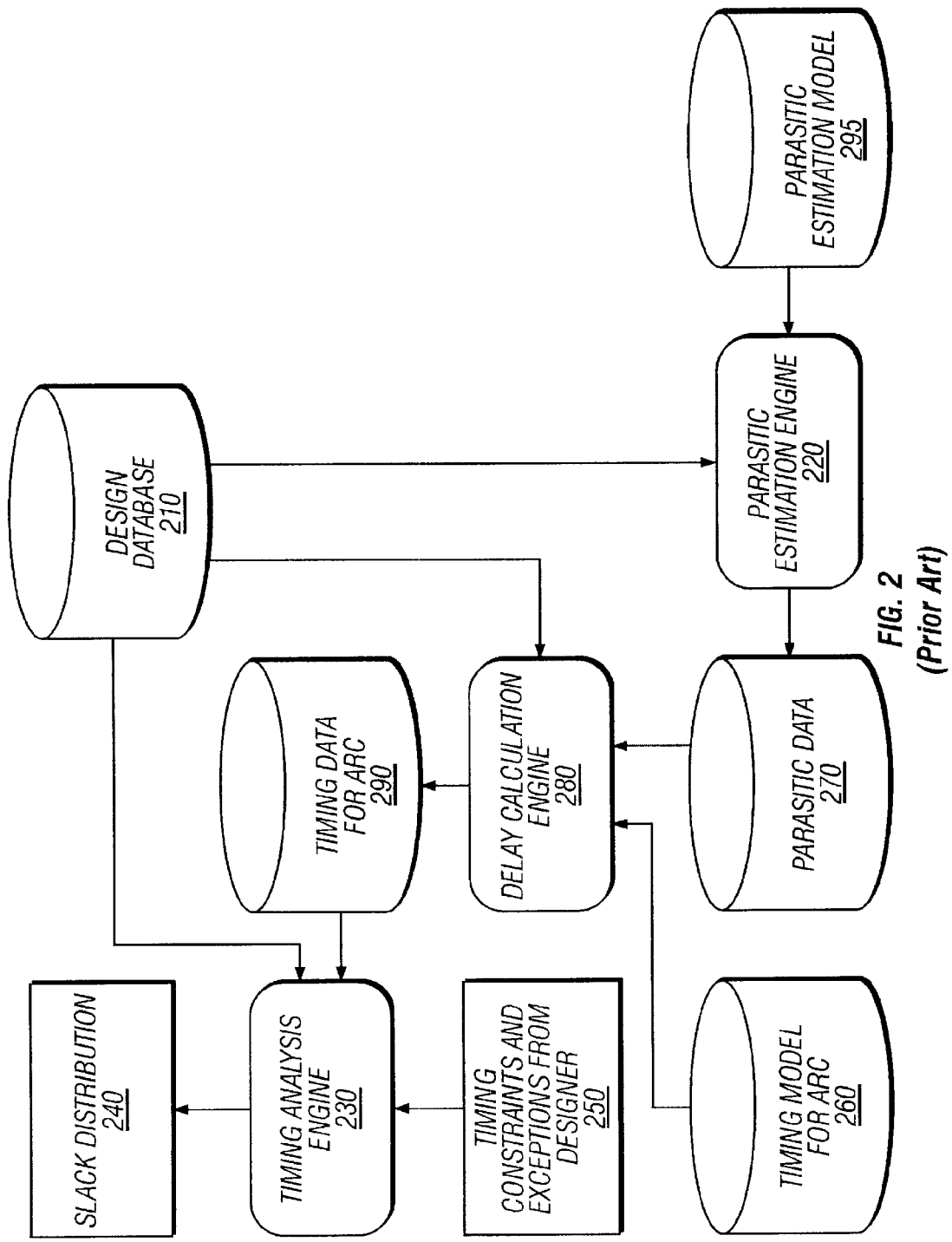
FIG. 2 is a flow diagram showing a method in the related art of designing an integrated circuit.
Figure 6:
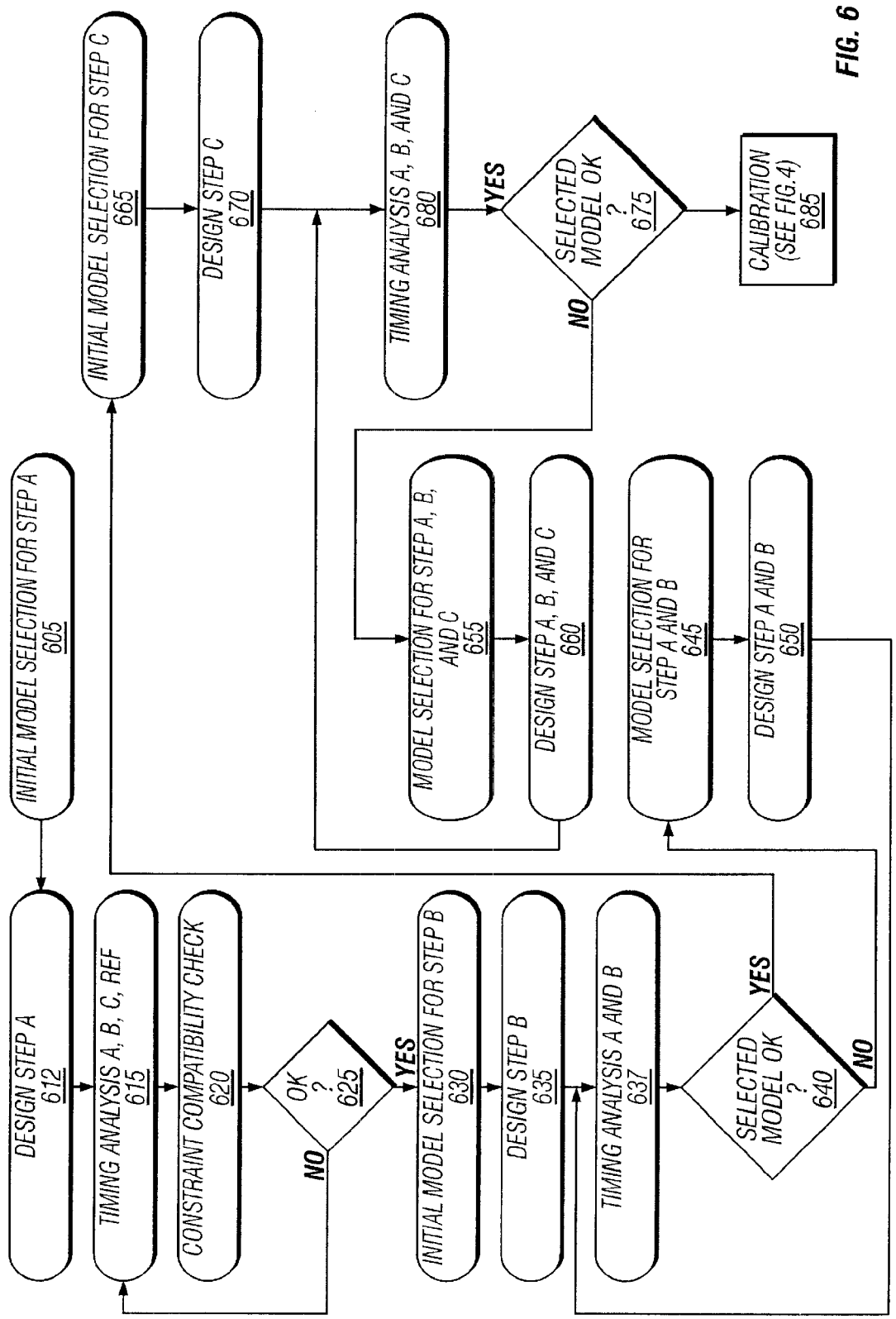
FIG. 6 is a flow diagram showing a scalable method for combining method to perform an embedded timing analysis.

FIG. 6 shows a method of further combining the steps described in FIG. 3A, FIG. 3B, and FIG. 4. This method is exemplified by design steps A, B, and C, as shown in FIG. 1. However, the method is scalable for more than three design steps. The identification and correction of mismatch, 370, in FIG. 3A and FIG. 3B, considering only selection of parasitic estimation models, 395, in FIG. 3A and FIG. 3B, is performed by going through the minimal number of design steps X. In order to decide whether the circuit has a poor structural hierarchy, it is only necessary to go through one subsequent design step X (X=A,B,C . . . M) at a time. In other words, design database X resulting from the immediately preceding design step can serve as a reference database for the purpose of selecting the parasitic estimation models for all preceding design steps. In order to perform design step A, 612, initial model selection for design step A, 605 (corresponding to 510 in FIG. 5), is necessary. All timing analyses X (X=A,B,C . . . M) and reference timing analysis, 615 (corresponding to 512, 514, 516, 518, in FIG. 5), are performed for the purpose of constraint compatibility check, 620, (corresponding to 520, in FIG. 5) involving the decision, 625 (corresponding to 530 in FIG. 5).

Still referring to FIG. 6, initial model selection for step B, 630, design step B, 635, and timing analysis A, B, 637, are performed. Based on decision, 640, model selection for step A and B, 645, design steps A and B, 650, timing analyses A and B, 637, are repeated until the models are suitable, as described in FIG. 3A and FIG. 3B. Subsequently, initial model selection for step C, 665, design steps C, 670, and timing analyses A, B, and C, 680, are performed. Based on decision, 675, model selection for step A, B, and C, 655, design steps A, B, and C, 660, and timing analyses A, B, and C, 680, are repeated until the models are suitable, as described in FIG. 3A and FIG. 3B. Once all selected models are suitable, as described in FIG. 3A and FIG. 3B, calibration is performed according to FIG. 4, 685.

The method disclosed is not restricted to a specific software, software language or software architecture. Each of the steps of the method disclosed may be performed by a module (e.g., a software module) or a portion of a module executing on a computer system. Thus, the above component organization may be executed on a desk top computer system or any other suitable computer system or electronic data processing system. The method may be embodied in a machine-readable and/or computer-readable medium for configuring a computer system to execute the method. Thus, the software modules may be stored within and/or transmitted to a computer system memory to configure the computer system to perform the functions of the module.

The operations described above and modules therefor may be executed on a computer system configured to execute the operations of the method and/or may be executed from computer-readable media. The method may be embodied in a machine-readable and/or computer-readable medium for configuring a computer system to execute the method.

Those of skill in the art will recognize that, based upon the teachings herein, several modifications may be made to the embodiments shown in FIGS. 1–6. For example, the method can be practiced to design an integrated circuit, integrated circuit or any other suitable electronic circuit.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method of designing an integrated circuit, comprising:
   designing an integrated circuit by RTL synthesis with embedded timing analysis and optimization;
   designing an integrated circuit by placement of cells with embedded timing analysis and optimization;
   designing an integrated circuit by routing of interconnect between cells with embedded timing analysis and optimization;
   performing reference timing analysis on the result of the integrated circuit design;
   performing reference timing analysis and embedded timing analysis using a parasitic estimation model, a timing model for arc, timing constraints and exceptions from designer; and
   comparing a first slack distribution resulting from a first timing analyses to a second slack distribution resulting from a second timing analyses.

2. The method of designing an integrated circuit as recited in claim 1, further comprising:
   based on the comparing step, identifying a cause of a mismatch between a first slack distribution and a second slack distribution.

3. The method of designing an integrated circuit as recited in claim 2, further comprising:
   comparing a total number of paths reported in slack distribution.

4. The method of designing an integrated circuit as recited in claim 3, further comprising:
   calculating and comparing autocorrelation functions of slack distributions.

5. The method of designing an integrated circuit as recited in claim 2, further comprising:
   calculating an interrcorrelation function of a slack distribution.

6. The method of designing an integrated circuit as recited in claim 2, further comprising:
   calculating an autocorrelation function of a slack distribution;
   calculating an interrcorrelation function a plurality of slack distributions; and
   comparing the autocorrelation function with the interrecorrelation function.

7. The method of designing an integrated circuit as recited in claim 2, further comprising:
   correcting a cause of a mismatch between slack distributions.

8. The method of designing an integrated circuit as recited in claim 7, further comprising:
   calibrating a parasitic estimation model after a cause of a mismatch has been corrected.

9. The method of designing an integrated circuit as recited in claim 1, further comprising:
   identifying a cause of a mismatch between a first slack distribution and a second slack distribution; and
   correcting a cause of a mismatch between a first slack distribution and a second distribution, wherein correcting a cause of a mismatch between a first slack distribution and a slack distribution further comprises;
   modifying a timing constraint; and
   selecting a parasitic estimation model.

10. The method of designing an integrated circuit as recited in claim 1, further comprising:
    based on the comparing step, calibrating a parasitic estimation model.

11. The method of designing an integrated circuit as recited in claim 1, further comprising:
    performing RTL synthesis but not performing layout;
    checking timing constraint compatibility for all embedded timing analyses performed on the result of RTL synthesis; and
    modifying timing constraints.

12. The method of designing an integrated circuit as recited in claim 1, further comprising:
    performing a design step after performing RTL synthesis;
    selecting a parasitic estimation model after performing one subsequent design step;

repeating a design steps if a selected parasitic model is not suitable; and changing a structural hierarchy if a selected parasitic model is not suitable.

13. An integrated circuit designed by a method, the method comprising:

designing an integrated circuit by RTL synthesis with embedded timing analysis and optimization;

designing an integrated circuit by placement of cells with embedded timing analysis and optimization;

designing an integrated circuit by routing of interconnect between cells with embedded timing analysis and optimization;

performing reference timing analysis on the result of the integrated circuit design;

performing reference timing analysis and embedded timing analysis using a parasitic estimation model, a timing model for arc, timing constraints and exceptions from designer; and comparing a first slack distribution resulting from a first timing analyses to a second slack distribution resulting from a second timing analyses.

14. The integrated circuit as recited in claim 13, further comprising:

based on the comparing step, identifying a cause of a mismatch between a first slack distribution and a second slack distribution.

15. The integrated circuit as recited in claim 14, further comprising:

comparing a total number of paths reported in a slack distribution.

16. The integrated circuit as recited in claim 15, further comprising:

calculating and comparing a first autocorrelation function of a first slack distribution to a second autocorrelation function of a second slack distribution.

17. The integrated circuit as recited in claim 14, further comprising:

calculating an interrcorrelation function of a slack distribution.

18. The integrated circuit as recited in claim 14, further comprising:

calculating an autocorrelation function of a slack distribution;

calculating an interrcorrelation function of a plurality of slack distributions; and comparing the autocorrelation function with the inter-recorrelation function.

19. The integrated circuit as recited in claim 14, further comprising:

correcting a cause of a mismatch between slack distributions.

20. The integrated circuit as recited in claim 19, further comprising:

calibrating a parasitic estimation model after a cause of a mismatch has been corrected.

21. The integrated circuit as recited in claim 13, further comprising:

identifying a cause of a mismatch between a first slack distribution and a second slack distribution; and correcting a cause of a mismatch between a first slack distribution and a second distribution, wherein correcting a cause of a mismatch between a first slack distribution and a slack distribution further comprises;

modifying a timing constraint; and selecting a parasitic estimation model.

22. The integrated circuit as recited in claim 13, further comprising:

calibrating a parasitic estimation model.

23. A computer program product, the computer program product encoded in computer readable media, the computer program product comprising:

a set of instructions, executable on a computer system, configured to:

design an integrated circuit by RTL synthesis with embedded timing analysis and optimization;

design an integrated circuit by placement of cells with embedded timing analysis and optimization;

design an integrated circuit by routing of interconnect between cells with embedded timing analysis and optimization;

perform reference timing analysis on the result of the integrated circuit design;

perform reference timing analysis and embedded timing analysis using a parasitic estimation model, a timing model for arc, timing constraints and exceptions from designer; and compare a first slack distribution resulting from a first timing analyses to a second slack distribution resulting from a second timing analyses.

24. The computer program product as recited in claim 23, further comprising:

a set of instructions configured to:

based on the comparing step, identify a cause of a mismatch between a first slack distribution and a second slack distribution.

25. The computer program product as recited in claim 24, further comprising:

a set of instructions configured to:

compare a total number of paths reported in a first slack distribution with a total number of paths reported in a second slack distribution.

26. The computer program product as recited in claim 25, further comprising:

a set of instructions configured to:

calculate a first autocorrelation function of a first clack distribution;

calculate a second autocorrelation function of a first slack distribution; and compare the first autocorrelation function to the second autocorrelation function.

27. The computer program product as recited in claim 24, further comprising:

a set of instructions, configured to:

calculate an interrecorelation function of a slack distribution.

28. The computer program product as recited in claim 24, further comprising:

a set of instructions configured to:

calculate an autocorrelation function of a slack distribution;

calculate an interrcorrelation function a plurality of slack distributions; and compare the autocorrelation function with the inter-recorrelation function.

29. The computer program product as recited in claim 24, further comprising:

a set of instructions configured to:

correct a cause of a mismatch between a first slack distribution and a second slack distribution.

30. The computer program product as recited in claim 29, further comprising:
   a set of instructions configured to:
      calibrate a parasitic estimation model after a cause of a mismatch has been corrected.

31. The computer program product as recited in claim 23, further comprising:
   a set of instructions configured to:
      identify a cause of a mismatch between a first slack distribution and a second slack distribution; and
      correct a cause of a mismatch between a first slack distribution and a second distribution, wherein correcting a cause of a mismatch between a first slack distribution and a slack distribution further comprises; modifying a timing constraint; and selecting a parasitic estimation model.

32. The computer program product as recited in claim 23, further comprising:
   a set of instructions configured to:
      calibrate a parasitic estimation model.

33. The computer program product as recited in claim 23, further comprising:
   a set of instructions configured to:
      perform RTL synthesis but not performing layout;
      check timing constraint compatibility for all embedded timing analyses performed on the result of RTL synthesis; and
      modify timing constraints.

34. The computer program product as recited in claim 23, further comprising:
   a set of instructions configured to:
      perform a design step after performing RTL synthesis;
      select a parasitic estimation model after performing one subsequent design step;
      repeat a design steps if a selected parasitic model is not suitable; and
      change a structural hierarchy if a selected parasitic model is not suitable.

\* \* \* \* \*